Figure 1:
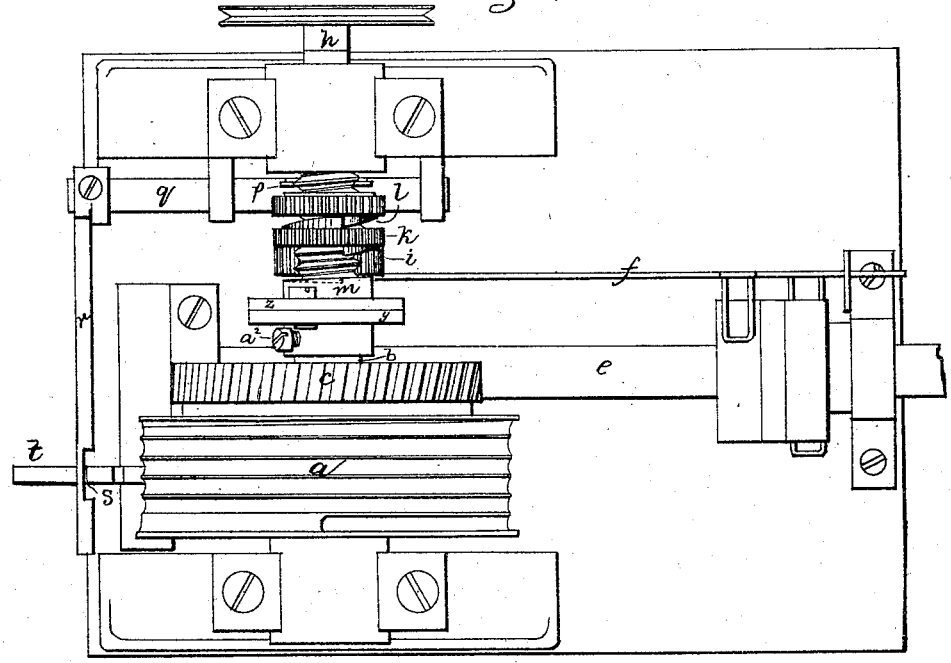

2 Sheets--Sheet 1.

C. WHITTIER.
Elevators.

No. 154,108.  
Patented Aug. 11, 1874.

Witnesses.  
Geo. T. Smallwood.  
Carlos Hickenlooper.

Inventor  
Charles Whittier  
per John J. Halsted.  
Atty.

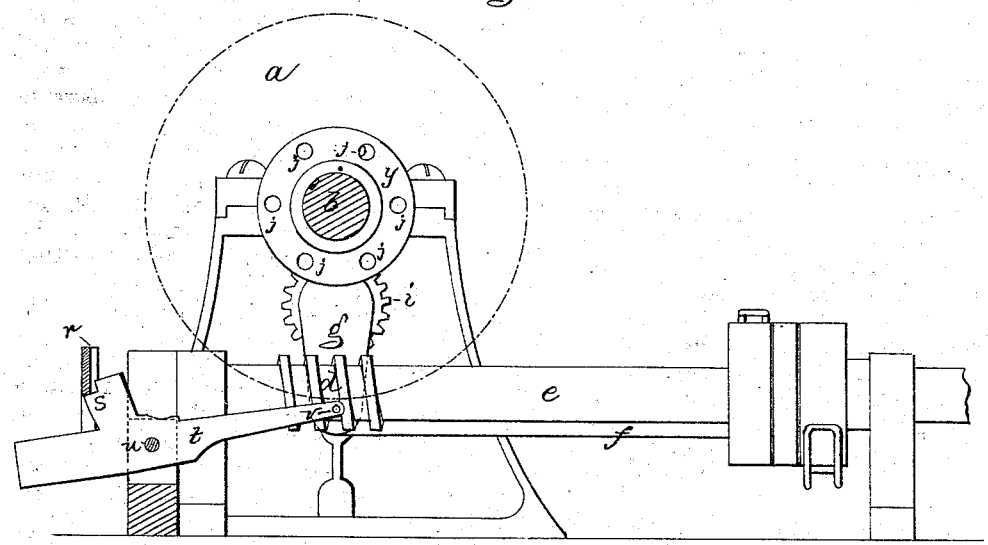

UNITED STATES PATENT OFFICE.

CHARLES WHITTIER, OF BOSTON, MASSACHUSETTS.

IMPROVEMENT IN ELEVATORS.

Specification forming part of Letters Patent No. 154,108, dated August 11, 1874; application filed June 19, 1874.

*To all whom it may concern:*

Be it known that I, CHARLES WHITTIER, of Boston, in the county of Suffolk and State of Massachusetts, have invented an Improvement in Elevators or Hoisting-Machines; and I do hereby declare that the following, taken in connection with the drawings which accompany and form part of this specification, is a description of my invention sufficient to enable those skilled in the art to practice it.

The invention has reference to a provision, in connection with the winding-drum of an elevator, for stopping the driving-shaft, and thereby arresting the winding-drum whenever, for any reason, the hoisting-rope slacks.

In many elevators an automatic stop-motion is applied for arresting the driving-shaft, by shifting the belt from the fast to a loose pulley, or by shutting off steam if a hoisting-engine be used, when the car reaches the upper or lower floor; and in my invention I combine, with the gearing of such automatic stop-motion and the slide-bar that shifts the belt or valve, a mechanism that is engaged with the gear of the shifting-bar, to operate the bar by the slack of the rope.

My invention consists, primarily, in the combination, with a stop-motion operated by a gear-nut riding on the screw-threaded shaft, of the winding-drum, or a screw-threaded shaft operated thereby, and a mechanism operated by a slacking-rope to engage with the mechanism of the shifting-bar, and operate said bar.

The drawing represents a winding-drum and drum mechanism embodying my invention.

Figure 2:
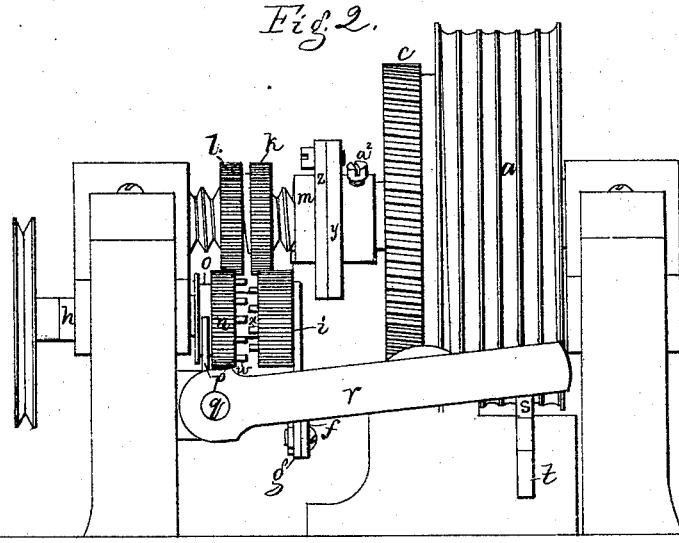

Figure 1 shows the mechanism in plan. Fig. 2 is an end view of it. Fig. 3 is a section on the line $x$ $x$.

$a$ denotes the winding-drum; $b$, the drum-shaft; $c$, the worm-gear of said shaft; $d$, the worm that drives the same, said worm being on the driving-shaft $e$, and said driving-shaft carrying the fast and loose pulleys, or being connected with the shaft of the engine, if a hoisting-engine be used. $f$ denotes the belt or valve shifting bar, jointed to an arm, $g$, of the shifting-shaft $h$. On the shaft $h$ is fixed the gear-pinion $i$, that engages with the gear-nut $k$ on the drum-shaft $b$, said shaft being screw-threaded, and the gear-nut $k$ being driven endwise as the shaft rotates. Its endwise motion is between a gear or collar, $l$, fast on the drum-shaft, and made adjustable by means of a key entering a groove in the collar and in the shaft, and a collar, $m$, also fast upon said shaft, this latter collar being made adjustable on the shaft, as hereinafter described, and being set in accordance with the extent of vertical movement the car is to have in each direction, each collar having a clutch on its inner face to engage with a clutch on the adjacent face of the sliding gear $k$, and this gear being always in engagement with the gear-pinion $i$ on the shifting-shaft $h$, the clutching of the gear-nut $k$ with the collar on either side of it causing the shifting-shaft to be operated to shift the belt from the fast to the loose pulley, or to shut off steam.

The mechanism thus described composes the ordinary stop-motion; and with this motion is connected the slack-rope stop-motion as follows: On the shifting-shaft $h$ is a slide-pinion, $n$, having an annular groove, $o$, into which enters a fork, $p$, extending from a shaft, $q$. On the outer end of this shaft is an arm, $r$, that normally rests on a shoulder, $s$, of a lever, $t$, said lever being hinged at $u$, and having its inner end extending under the hoisting-drum, with a bar, $v$, projecting laterally in each direction from it, so that, if any coil of the rope on the drum slacks in the least degree from the drum it will strike the bar $v$, and tip the lever $t$, so as to dislodge the arm $r$ from the shoulder $s$, the arm being then free to fall by gravity. The arm, in falling, throws the pinion $n$ toward the pinion $i$, the two pinions being provided with clutches or clutch-pins $w$ $x$, and their contact being insured by the dropping of the arm $r$, the contact causing the movement of the valve or belt-shifting bar $f$.

By this arrangement the two stop-motions are combined; but it will be obvious that the mechanism operated by the slack of the hoisting-rope may be used independently from the clutch-collars $l$ $m$ and gear-nut $k$.

The collar $m$ is shown as made with two flanges, $y$ $z$, the flange $y$ being made fast to the shaft by a set-screw, $a^2$, which enters a slot in the shaft, and the two flanges being bolted together. To relatively adjust the flanges, they are made with a different number of bolt-holes, $j$, so that holes of the respective flanges may be brought into line by slight rotative movement of the flange $y$.

I claim—

1. In combination with the valve or belt shifting mechanism, the lever $t$, operated by the slack of the hoisting-rope, and operating the shifting mechanism, substantially as described.

2. In combination with the stop-motion, operated by the drum-shaft, a stop-motion operated by the hoisting-rope, substantially as described.

3. The lever $t$, arm $r$, shaft $q$, fork $p$, and clutch-wheels $l\ m$, arranged and combined to operate substantially as described.

4. The clutch-collar $m$, formed with two relatively-adjustable flanges, $y\ z$, substantially as shown and described.

CHARLES WHITTIER.

Witnesses:
M. W. FROTHINGHAM,
S. B. KIDDER.